UNITED STATES PATENT OFFICE.

FREDERIC EUGENE IVES, OF PHILADELPHIA, PENNSYLVANIA.

COLOR PHOTOGRAPHY.

1,247,116.  Specification of Letters Patent.  Patented Nov. 20, 1917.

No Drawing.  Application filed March 12, 1915. Serial No. 13,898.

*To all whom it may concern:*

Be it known that I, FREDERIC E. IVES, a citizen of the United States, residing at Philadelphia, in the county of Philadelphia and State of Pennsylvania, have invented certain new and useful Improvements in Color Photography, of which the following is a specification, reference being had therein to the accompanying drawing.

This invention relates to color photography, and more especially to the production or duplication of print copies from mosaic screen-plate color transparencies. There are known at present several species of mosaic screen-plate color transparencies, as an example of which may be mentioned the so-called "autochromes" of Lumiere. Heretofore no satisfactorily simple or perfect method has been devised for duplicating or making copies from such transparencies. It is an object hereof to afford a more simple and practical mode of duplicating or producing copies from such transparencies, namely, transparent copies, or, on the other hand, prints on paper in the nature of ordinary photographs.

Another object hereof is to obviate the need of producing three or other plural number of separate color-selection negatives from the mosaic transparency from which are made three separate color prints to be suitably combined.

Other objects and advantages will appear in the hereinafter following description, and further advantages will be understood by those skilled in the art.

To the attainment of the cited objects the present invention consists in the novel methods, steps, materials, products and other features set forth in the accompanying description.

The general plan of the present invention is to dispense with the making of negatives from the original mosaic screen-plate transparency, and to enable the making of a plurality of separate monochrome color prints directly from the transparency itself, which, however, is employed in a modified condition, in the preferred embodiment of my invention.

For the purposes hereof the autochrome transparency will be taken as representative, and the three-color system will be assumed, although, obviously, other mosaic transparencies could be employed or systems using two or four or other plural number of colors.

My procedure may be substantially as follows: After exposure the usual autochrome plate is always first developed as a negative image, exhibiting light and shade and colors complementary to those of the finished autochrome. Where red is to appear in the final picture a blue green appears at this stage, owing to the obliteration of the red elements of the mosaic and the exhibition of the blue and green elements. In the autochrome process this development is followed by a reversing process which uncovers the red and blocks out the blue and green elements so as to afford the desired color.

According to my process the autochrome plate would be developed to the negative stage referred to and preferably the subsequent reversal or conversion would be omitted. The mosaic color negative image developed is complementary in light and shade, as well as in color, to the true final image in a way analogous to the complementary character of an ordinary photographic negative as compared to the subsequent positive made therefrom. Further, such color negative is a "reversed" negative as to the position of the subjects of the picture, for the reason that the autochrome plate is exposed in the camera with its sensitive surface turned away from the lens.

Taking the primary colors as red, green and blue, the secondary or printing colors would be, for the red a peacock blue, for the green a magenta pink, and for the blue a yellow. In an autochome transparency the elements of the mosaic are entirely of the three primary colors, red, green and blue. Yellow is produced by the added effects of red and green upon the eye, magenta by the added effects of red and blue, and peacock by the added effects of blue and green. For example, a section of the picture in which the blue elements are blocked out and the eye sees only the microscopic red and green elements the effect of yellow is produced. The various color effects are, therefore, produced by addition. This is contrary to the process of building up a multicolor picture, for example, by superposing colloid reliefs of the secondary colors, peacock, magenta and yellow. In that system to secure one of the primaries two of the secondaries are superposed, for example, to secure red there would be superposed yellow and magenta areas. Transparent yellow admits the passage of red and green but excludes blue, while transparent magenta admits the passage of red and blue but excludes green; therefore yellow and magenta superposed will exclude or subtract both blue and green and yield a resulting red. This is the subtractive system.

In the present improvement I pass from the system of addition to the system of subtraction for duplicating multicolor pictures. Thus, with the autochrome negative, and by the use of a blue screen giving blue printing light, I produce a positive which is to be colored yellow, likewise with a green screen I produce a positive corresponding to the green elements of the autochrome negative and color that magenta. Also by red light a peacock colored positive is made. The three positives, yellow, magenta and peacock, superposed will yield the desired multi-color image by the subtractive system.

As I prefer the colloid relief process for making the transparent monochrome positives, which are to be combined in the final picture, I will describe the preferred procedure on that principle. A bichromated colloid film upon a transparent support, such as celluloid, is printed through its base behind the autochrome negative by means of blue light secured by a blue screen. Upon the completion of the exposure the colloid film is developed by washing in warm water so as to produce a tenuous relief and is then stained or dyed of a yellow color. This monochrome of yellow color is representative of the blue elements of the autochrome negative and consequently is representative of the minus blue, or yellow, elements of the monochrome positive. In fact, it corresponds to and resembles the yellow monochrome print obtained from a separate blue-light record negative in the ordinary forms of three color process. Similarly by a green light a bichromated colloid is exposed and developed into a relief and is dyed of a magenta color giving a magenta image to be subsequently combined with the yellow image already referred to.

In the case of the third or red portion of the autochrome negative this process cannot be followed because when printing by red light through the negative a colloid relief or positive cannot be obtained by the bichromate process. The bichromated colloid is practically insensitive to red light. I, therefore, resort to a different method for making the third or peacock blue monochrome from the red portions of the mosaic screen-plate negative. For example, from the negative, covered by a red screen, a so-called gaslight print may be made upon a silver bromid paper which, unlike the ordinary bromid paper of commerce, has been rendered sensitive to red light by special treatment, for example, with a color sensitizing dye such as pinacyanol. Exposure and development yields a black and white positive image. This subsequently may be converted into a peacock blue print by certain chemical agents. For example, a solution of ferric ammonium citrate with potassium ferric cyanid and acetic acid will convert the silver into Turnbull's blue and a subsequent "hypo" bath will change it to peacock blue. This peacock colored print, instead of being made directly upon paper, may be made upon a transparent base which may later be so secured above a paper back as to obviate a reversed position relatively to the yellow and magenta monochromes.

The yellow and magenta monochromes may now be assembled, with their relief side topmost, the autochrome negative being a reversed negative, and with the peacock monochrome so as to combine the three monochromes by the method of superposition or subtraction, thus building up and attaining the final multi-color picture.

Proceeding with the autochrome negative another system of producing the three transparent monochrome positives may be employed with advantage, this system, generally speaking, being such as is described in a co-pending application of mine, Serial No. 14,223, filed March 13, 1915. Such method dispenses with the delay and uncertainty of daylight printing such as necessitated by the bichromated gelatin method. Such method is substantially to print from the autochrome negative, with the respective color screens as before stated, upon unbichromated colloid layers containing a suitably color sensitive silver salt and preferably also a light restraining agent such as a non-actinic water soluble dye. Development of each silver image may be followed by treatment with a suitable desolublizing agent such as ammonium bichromate plus potassium bromid. This renders insoluble those portions of the gelatin in intimate contact with the reduced silver. By following this step by washing in hot water the undesolublized gelatin is dissolved and a tenuous gelatin relief obtained which may be cleared by dissolving the silver image and may be subsequently dyed of the proper secondary color. Three monochrome images produced in this way, of the three printing colors may be combined by imbibition, superposition or otherwise to secure, as before, the final multicolor picture, and are, in fact, substantially identical in character with those produced by printing in bichromated gelatin.

To dissolve the silver image in accordance with the above description we may first immerse in a solution of potassium bichromate with potassium bromid acidified with sulruric acid to convert the metallic silver into silver bromid and thereafter immersing in "hypo."

While the above described methods employ an autochrome negative from which the components of the final multicolor picture are directly made, the same general principles may be applied in a process which starts with the autochrome positive. As our object is to produce colored positive images by direct printing from the original autochrome, if the autochrome negative image has been converted into a positive image in the usual way, our printing process must produce a positive print from a positive image, the exact reverse of what is done to produce positive color prints by the colloid relief print process already described, which can only produce a negative print from a positive image. Suitable positive color prints can be made direct from the positive autochrome image by printing upon the face of suitable color sensitive gelatin silver bromid films and developing the metallic silver image in the usual way, then treating the image with an agent, such as potassium bichromate which hardens the gelatin in immediate contact with the metallic silver grains embedded therein, followed by dissolving out the metallic silver, by first converting it into silver bromid or silver chlorid and then dissolving in sodium thiosulfite. If there is added to the potassium bichromate bath some potassium bromid and sulfuric acid, the hardening of the gelatin and the conversion of the metallic silver into silver bromid proceed simultaneously, and it remains only to dissolve out the silver bromid in the sodium thiosulfite. The film so treated, but preferably after drying, is then immersed in a suitable dye bath, such as a solution of patent blue, or fast red, or tartrazin, in which it will then absorb proportionately to the variations of hardening of the surface gelatin, to produce a colored positive quite similar in appearance to the dyed colloid relief positives, and serving the same purpose in the production of composite color prints. Also, a print made on the face of a bichromated gelatin film by printing out in the usual way, has the same property of yielding a positive dye image from a positive by immersion in a suitable dye bath. This method is less precise and definite in its operation than I have made the production of dyed colloid relief prints, but may be practically useful when it becomes necessary to make the prints from finished autochromes.

The object of my invention is to dispense with the intermediate production of separate color-selection negatives in the production of three-color prints from party-colored or screen-plate color photographs, thus simplifying and cheapening the process, and also eliminating an unnecessary and well-recognized source of error due to multiplicity of processes and imperfect rendering of gradation by the intermediate negatives. This involves a coördination of color sensitiveness in the color-print producing medium with such colors of printing light as will make each print record only its appropriate color elements of the original party-colored image, in such manner as I have set forth.

It will thus be seen that I have described a method attaining the objects and advantages hereinbelow referred to. Since many matters of manipulation, ingredients, preparations, order or succession of steps and other features may be variously modified without departing from the principles involved, no limitation to such features is intended excepting in so far as recited in the pending claims.

What is claimed is:

1. The method of producing a color print direct from a three-color mosaic screen-plate color-photograph transparency, such method consisting in exposing under such transparency successively three sensitive films each to the action of light having a color differing from that for the others but corresponding to one of the primary colors of the screen plate, treating the films thus exposed to cause each to yield a colored developed image of a color complementary to the printing light; and combining the resulting three distinctively colored monochrome prints to produce a polychrome print.

2. The method of producing a peacock blue positive print from a mosaic screen plate color photograph, which consists in exposing to red light and beneath such plate a coating of red-sensitized bromid of silver, developing this print as a metallic silver image, and subsequently converting the same into a blue print.

3. The method of producing a monochrome print from a mosaic screen-plate color transparency, including the following steps, exposing to light having a color corresponding to one of the primary colors of such plate and behind the transparency of a color-sensitized silver-bromid film, developing to produce a metallic silver image, and subsequently converting the same into a monochrome print of a color complementary to that of the light employed in its production.

4. The method of producing a monochrome photograph from a mosaic screen-plate color transparency, including the following operations, in order named: exposure behind the mosaic screen-plate color transparency, of a color-sensitized gelatin-bromid of silver film to light having a color corresponding to one of the component colors of the transparency; development to produce a metallic silver image, treatment with a solution of bichromate and bromid salts, development to a relief print by hot water, clearing out of metallic silver image, and dyeing the resulting colloid relief print a color complementary to that of the light employed in its production.

5. In the art of color photography the method of producing a multi-color print from a color mosaic transparency comprising producing separate positive monochrome images, by exposure of sensitive films successively behind the transparency, each to light having a color corresponding to one of these of the mosaic and differing from that for the others, developing and fixing the images, coloring each a color complementary to that of the light by which it was produced and combining said monochrome images into a multi-color-print.

6. In the art of color photography the method of producing a multi-color print from a color mosaic transparency comprising producing separate positive monochrome images, by exposure of films each sensitized, at least one being a sensitized colloid, successively behind the transparency, each to light having a color corresponding to one of those of the mosaic and differing from that for the others, developing and fixing the images, coloring each a color complementary to that of the light by which it was produced, and combining said monochrome images into a multi-color print.

7. The method of producing color prints on paper directly from a mosaic color transparency, including the following steps: exposing to red colored light behind the mosaic transparency a red sensitized bromid paper, exposing behind such transparency to a different colored light, but one corresponding to one of primary colors of the transparency, a transparent film sensitized to such light, developing and fixing the images, coloring each a color complementary to that of the light by which it was produced, and superposing said transparent monochrome upon said paper monochrome.

8. The method of producing color prints on paper directly from a transparent three-color photographic mosaic in the negative stage, including the following steps: exposing to red colored light behind the mosaic a sensitized silver paper, and subsequently treating the same by the conversion process to produce a blue-green positive monochrome on paper, exposing to green light behind the mosaic a colloid coating, developing the same into a colloid relief and dyeing it to produce a transparent pink monochrome, exposing to blue light behind the mosaic a colloid coating, developing the same into a colloid relief and dyeing it to produce a transparent yellow monochrome, and finally superposing said pink and yellow transparent monochromes upon said blue-green paper monochrome.

In testimony whereof, I have affixed my signature in presence of two witnesses.

FREDERIC EUGENE IVES.

Witnesses:
 FRED. C. MARTIN,
 ALFRED THOMPSON.